United States Patent [19]

Steele

[11] Patent Number: 5,729,108
[45] Date of Patent: Mar. 17, 1998

[54] MANUAL CONTROL SYSTEM FOR CAMERA MOUNTINGS

[75] Inventor: Stephen John Steele, Suffolk, United Kingdom

[73] Assignee: Vitec Group PLC, Suffolk, United Kingdom

[21] Appl. No.: 564,086
[22] PCT Filed: Jun. 8, 1994
[86] PCT No.: PCT/GB94/01237
  § 371 Date: Dec. 8, 1995
  § 102(e) Date: Dec. 8, 1995
[87] PCT Pub. No.: WO94/29637
  PCT Pub. Date: Dec. 22, 1994

[30] Foreign Application Priority Data

Jun. 8, 1993 [GB] United Kingdom ............... 9311830

[51] Int. Cl.⁶ ........................................ G05B 19/33
[52] U.S. Cl. .................. 318/575; 318/587; 180/19.1;
  180/333; 180/443; 248/177.1; 248/404;
  414/589
[58] Field of Search ................. 318/568.12, 568.11,
  318/568.16, 568.14, 575, 580, 587, 615,
  543, 552; 180/19.1, 19.3, 333, 443–446;
  248/177.1–179.1, 404; 414/589, 590

[56] References Cited

U.S. PATENT DOCUMENTS

| 4,847,543 | 7/1989 | Fellinger | 318/628 |
| 4,953,126 | 8/1990 | Fabiano et al. | 414/590 |
| 5,509,630 | 4/1996 | Bringuier | 248/178.1 |
| 5,516,070 | 5/1996 | Chapman | 248/404 |

FOREIGN PATENT DOCUMENTS 2211137  12/1974  France .

*Primary Examiner*—Brian Sircus
*Attorney, Agent, or Firm*—Kenyon & Kenyon

[57] ABSTRACT

The disclosure relates to a camera mounting (11) providing a number of axes of movement for a camera supported on the mounting with a motor drive for each axis. A manually operable control system is provided for the motorized drives having a control member (16) and means operable in response to forces applied manually to the control member in the direction of the respective axes to energize the corresponding motor drive or drives for the mounting to produce movement of the mounting proportional to the force applied in the or each axis.

5 Claims, 3 Drawing Sheets

MANUAL CONTROL SYSTEM FOR CAMERA MOUNTINGS

This invention relates to a manual control system for a camera mounting such as robotically controlled mobile pedestal with steer drive and height controls operable by a remote joystick control or a pan/tilt mounting for a camera.

The control system for the pedestal includes a pendant controller which gives XY control with height remaining on the rotary axis; a further feature of the pendant is that it is 'pan-relative'. This means that with the pendant mounted on the pan-bars, whatever the pan angle of the head, the pedestal will always move in the direction of joystick deflection.

The joystick pendant has been enhanced to the limit of it's capability. It offers reasonably intuitive control, but a better manual control system is needed for the following reasons:

'Motion memory' demands an ergonomic manual control to input movement.

Combined trucking and height moves are difficult to control with joystick pendant.

Similarity to conventional pedestals to allow intuitive control by cameramen without the need for retraining.

U.S. Pat. No. 4,847,543 discloses a motion control apparatus for a video or motion picture camera mount comprising; a control handle fixedly coupled to said camera mount; pressure transducer means coupled to said control handle for generating electrical signals corresponding to a direction and velocity of desired motion of said camera; first motor means coupled to said pressure transducer means for moving said camera in a left pan and right pan direction; second motor means coupled to said pressure transducer means for moving said camera in a positive tilt and negative tilt direction; first worm drive means coupled to said first motor means and said camera mount for converting an angular velocity generated by said first motor means into a pan left or pan right motion of said camera; and second worm drive means coupled to said second motor means and said camera mount for converting an angular velocity generated by said second motor means into a positive tile or negative tile motion of said camera.

This invention provides a camera mounting providing one or more axes of movement for a camera supported on the mounting, motor means for driving the mounting in the or each axis of movement and a manually operable control system for said motor means having a control member and means operable in response to a force or forces applied manually to the control member in the direction of the or each axis of movement of the mounting to energise said motor means for the mounting and produce a movement of the mounting dependent on the force applied in the or each axis; wherein the mounting comprises a pedestal having a base supported on motorised steerable wheel units, a motorised vertically adjustable column and a platform for receiving a camera at the upper end of the column, the manually operable member of the control system being mounted on the column for rotation about the column axis and said load responsive means being arranged to control the motor means for extending and retracting the column along said vertical axis in response to a vertical force on the control member and for driving the motorised wheel units of the base of the pedestal for moving the pedestal in a horizontal direction in response to a horizontal force in the required driving direction and means being provided for steering the motorised wheel units in response to rotation of the control member about the column for steering the pedestal in the required direction.

The proposed manual control system outlined below offers the benefit of fine control with servo assistance plus the ability to switch from manual to remote and vice versa at the flick of single switch.

A further feature of the control system is the provision of manual interface to a pedestal such as an EXYped which is as close to using the steer-ring on a conventional pedestal as possible.

It is proposed to limit the steer-ring to a segment of approximately 60 degrees such that there is no confusion as to where to hold the control device.

The ring segment will be free to rotate around the height axis to control pedestal wheel steering. It is important to preserve a 1:1 relationship between the angle of the control and that of the wheels.

A conventional pedestal requires significant force to rotate the steer-ring; this is largely dependent on the floor surface. Friction will be deliberately introduced into the rotary axis of the control device to resist free motion; this will limit input accelerations so as to allow the steer wheels to stay synchronised with the control device.

The control will be configured such that when a force is applied in the vertical axis the height column will move up or down; similarly when a force is applied horizontally toward or away from the operator the pedestal will drive in those directions. Special measures will need to be taken to ensure that positive feedback does not develop while the control force is applied.

The control will have an electronic system to simulate the inertia experienced when operating height and drive manually. The exact 'feel' will differ since drive has a greater inertia than height. The feel will be adjustable. The effect must be to require a greater force to be applied to initially move the axis; followed by a lesser force to maintain the movement.

Although some ring segment deflection is necessary to actuate the strain gauge sensors this should be kept to a minimum, say +/−3 mm. The ring segment should give the impression of a mechanically rigid device when the control force for height or drive is applied.

The size, colour and finish of the control will be similar to a conventional pedestal steer-ring such that an operator approaching the pedestal will immediately recognise the control and it's purpose. A red band will be placed centrally on the ring segment.

The control device will be mounted at the top of the pedestal and will be free to rotate independently of the camera support head.

The steer-ring segment will be of sufficient diameter to be clear of, for example, the MH240m head. However, the size is constrained by the need to keep clear of the pan-bars when tilting up. Generally, the position of the steer-ring segment should give comfortable two-handed operation when used in conjunction with the pan-bar mounted lens controls.

The following is a description of a specific embodiment of the invention, reference being made to the accompanying drawings in which.

Figure 1:
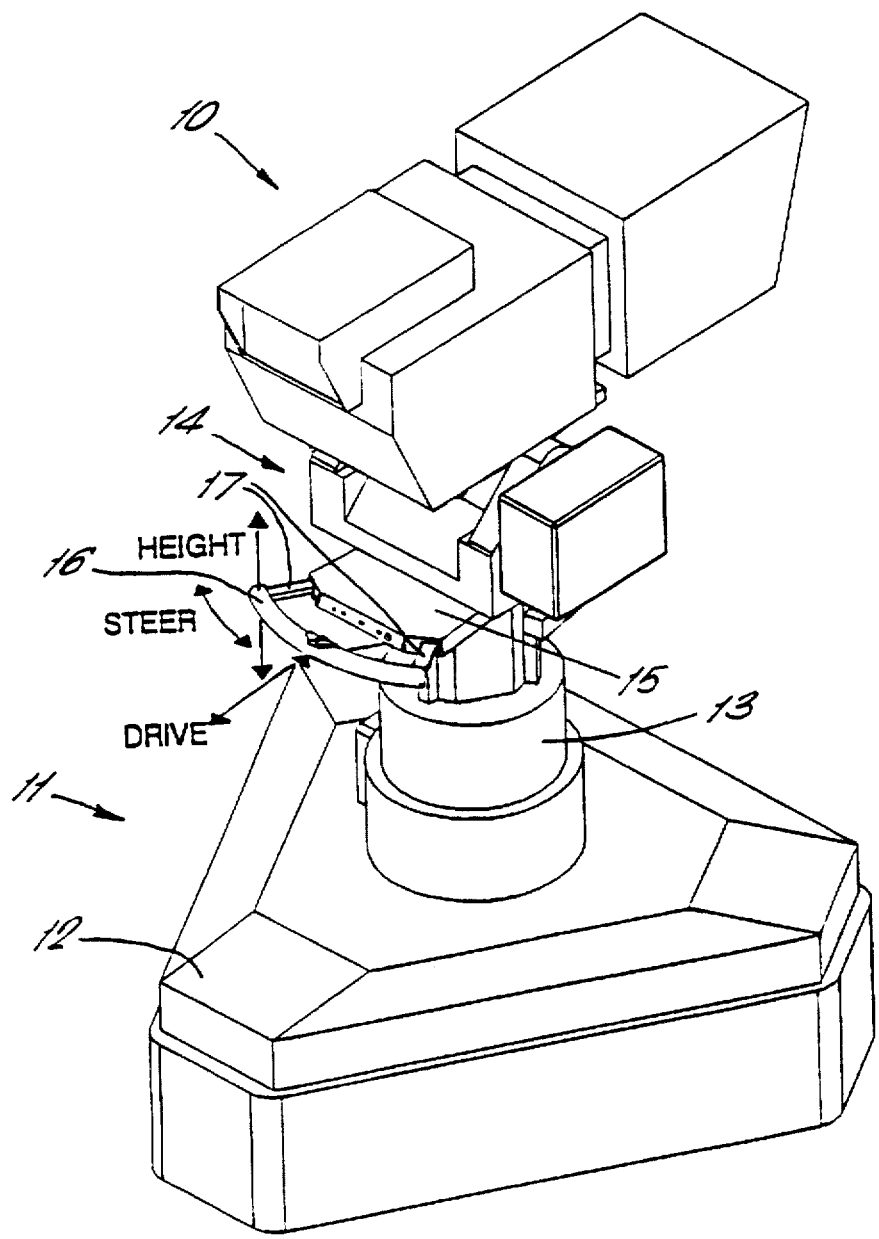
FIG. 1 is a diagramatic perspective view of a TV/Video camera mounted on a robotically controlled pedestal.

Referring firstly to FIG. 1 of the drawings, there is shown a TV/Video camera 10 mounted on a robotic pedestal indicated generally at 11. The pedestal comprises a triangular base 12 having steerable wheel units (not shown) at the three apices thereof. Two of the wheel units are motorised and are also coupled to a motorised steering system. The third unit is a free-wheeling castor-mounted unit which follows the other two units.

The pedestal has a central upstanding motorised multi-stage vertically-extending column 13. The camera 10 is mounted at the upper end of the column by means of a pan/tilt mounting indicated at 14.

A control unit 15 is mounted at the top of the column immediately below the pan/tilt mounting and is free to rotate about the vertical axis of the column 13. An arcuate control member 16 is mounted on the control unit 15 by means of struts 17 at the ends of the control member. The camera operator uses the manually operable control member 16 to raise and lower the camera, drive the pedestal in forward and reverse directions and steer the pedestal through a control system interfaced with the motorised units providing those functions. The control system includes force detecting means for responding to upward and downward force applied to the arcuate control member 16 by the operator to extend and retract the column 13 at a speed proportional to the force applied to the handle. This provides a 'friction' feel. Likewise, the manual control system has means to detect and respond to a force applied to the handle horizontally to control the motorised units for the base of the pedestal to drive the pedestal forwards and backwards at an acceleration and speed proportional to the force applied to the handle. The acceleration component is time dependent and provides the "inertial" feel.

For Force $|F|>|F\ minimal|$

SPEED DEMAND=PRESENT SPEED+K $\int(F-F\ min)\ .dt$.

Finally, rotation of the control unit 15 about the column is arranged, through the control system, to cause the motorised wheel units at the base of the pedestal to steer. There is a 1.1 ratio between turning of the control unit and turning of the wheels.

The force control Active Steer-Ring (ASR) will simulate a section of a standard "Fulmar" type steer-ring so that:

rotation of the arcuate handle around the pedestal will cause steering, up/down force applied to the force handle will cause elevation movement, in/out force applied to the force handle will cause drive motion.

Figure 2:
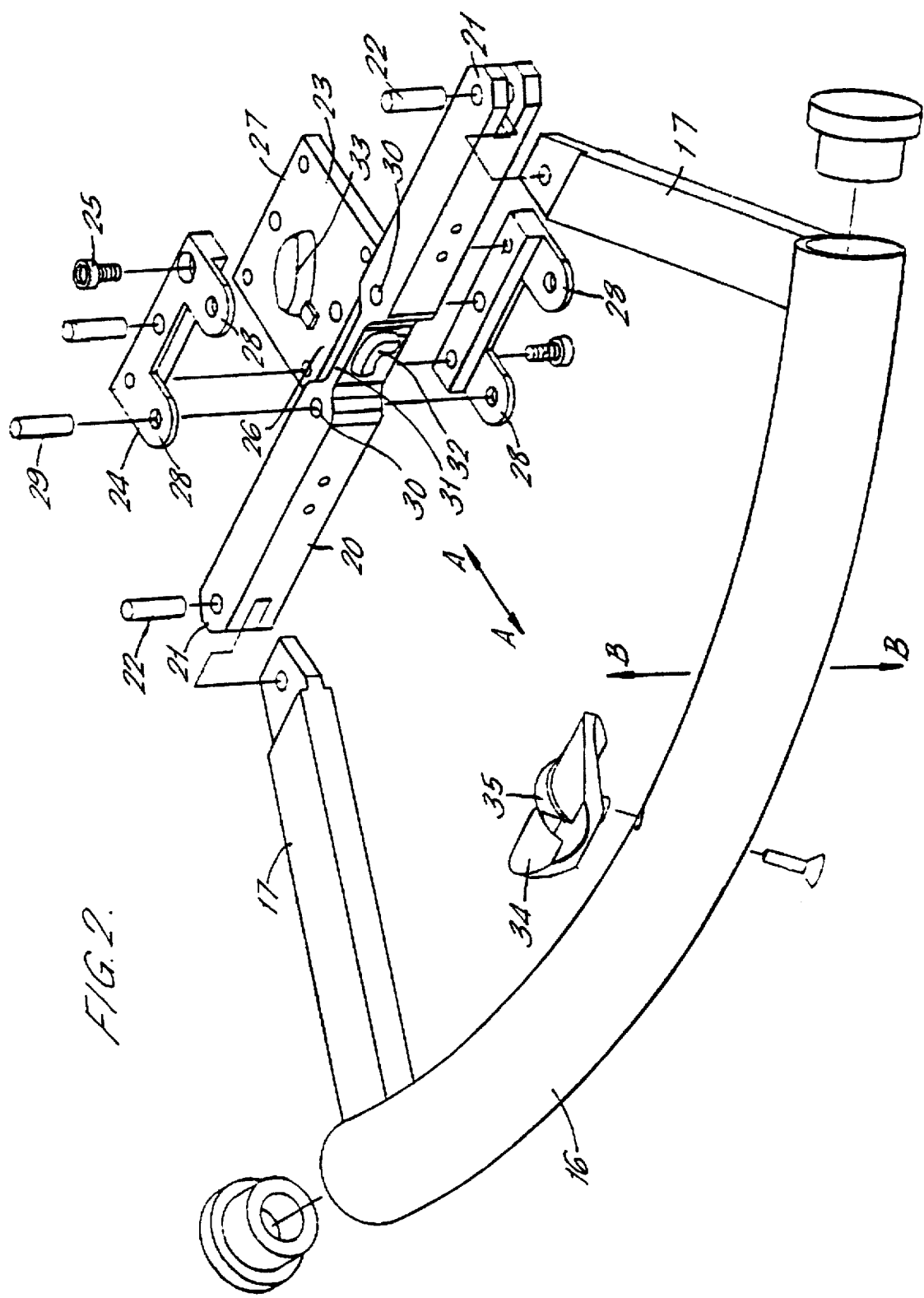
FIG. 2 is a diagramatic view of a hand control for controlling various movements of the pedestal.

Reference is now made to FIG. 2 of the drawings which illustrates the manner in which the arcuate control member for the pedestal is coupled to the control system for drive motors for the pedestal and for the column.

The control system includes an elongate member 20 having forked ends 21 to which the ends of the struts 17 are connected by means of pivot pins 22. The elongate member 20 is mounted towards its central region on a mounting plate 23 by means of upper and lower brackets 24 secured by bolts 25 along one edge 26 of the plate. The opposite edge 27 of the plate is mounted by further bolts to a part of the control unit 15. Each bracket 24 has a pair of laterally extending lugs 28 which project above the upper and lower sides of the member 20 and are connected thereto by pivot pins 29 extending through holes 30 in the member. Thus, the member 20 is mounted to the plate 23 for bending about the pivot pins 29 when a force is applied to the handle 16 in the direction of the arrows A—A to drive the pedestal forwards or backwards. The handle 16, struts 17 and member 20 are all symmetrical about a line extending through the center of the member 20 and the handle 16 so that the force applied to the handle applies a bending moment to the neck portion of the member 20 with a uniform stress throughout the length of the portion. Strain guages 32 are mounted on the front and rearward sides of the neck portion to provide a response to the stress applied to the neck portion and to control the motorised units for the pedestal to drive the pedestal forwardly or rearwardly according to the direction in which the neck portion is bent and since the stress throughout the neck portion is uniform, the strain gauges can be located in any position on the surfaces of the neck portion and do not require precise location.

Upward and downward force applied to the handle 16 bends the plate 23 about its fixed edge 27 and strain guages 33 applied to the upper and lower surfaces of the plate to detect the stressing of the plate and thereby provide a signal to the control system for extending and retracting the column of the pedestal in accordance with the force applied in the upward/downward direction to the handle 16.

An arcuate plate 34 is mounted centrally on the handle 16 with an embossed rib 35 indicating the center line of the handle.

Figure 3:
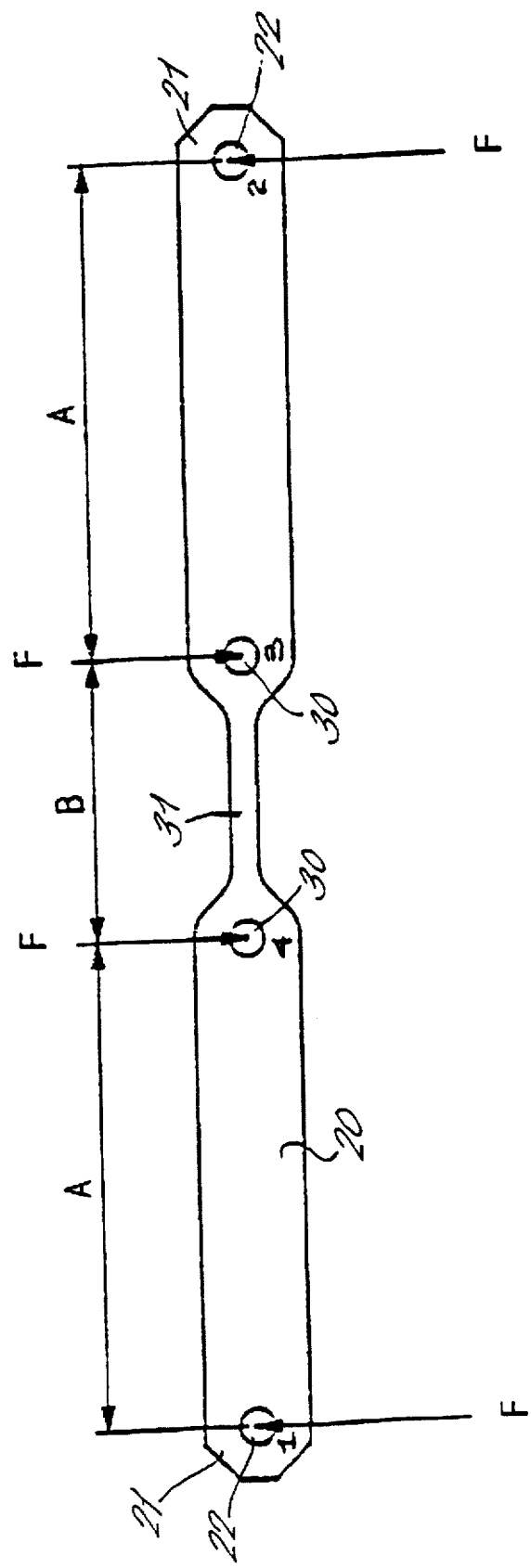
FIG. 3 illustrates a force responsive member of the control system.

Reference is now made to FIG. 3 of the drawings which illustrates verification that the neck portion 31 is subjected to a uniform stress and therefore strain by application of force to the member 20 by the handle 16.

Assuming a force of 2F is applied to the steer-ring this is transferred to the drive stressed member at pivots 22. The reaction is provided by pivots 29. Using engineers theory of bending for small displacements, stress, σ at the pivots 3, 4 and all points inbetween $\sigma = FA/Z$  Z=section modulus so where cross section is constant, max stress at surface is constant Strain=σ max/E  E=Youngs modulus therefore strain is constant between the supports.

Steer direction will be indicated by the embossed red steer indicator 35.

The control panel, consisting of three toggle switches and a jack plug socket will be positioned on the main body between it and the steer-ring segment.

The device consists of five main mechanical areas.

Main body.

Bearing arrangement.

Head/ped interface.

Steering device.

Height/Drive mechanism.

Switch inputs

Three toggle switches will be provided for the following functions:

/Enable: ASR is enabled.

/Rotate: ASR is in rotate mode.

/Record: Motion memory is enabled.

Steer Axis Control

The steer demand input to the pedestal is a voltage proportional to the angular position of the control handle with respect to the pedestal.

The control handle will not be fitted with mechanical endstops. This will allow the operator to move freely around the pedestal.

Rotation of the control handle around the pedestal will cause an immediate response from the steer servos such that the steer angle will match the ASR angle.

Drive control

This control should simulate a predominantly inertial payload subjected to a relatively high Coulomb friction. Measurements on a typical Fulmar pedestal indicate that friction forces amount to about 50% of the total force required to achieve full acceleration.

For safe operation the speed demand voltage out of the processing circuit should decay to zero within a safe distance upon release of the control handle.

A desirable feature is that a forced stop may be achieved by opposing the motion of the pedestal. Ideally the pedestal should not overshoot under such circumstances.

Column height control

This control should simulate a friction dominated column. Measurements on a typical Fulmar pedestal indicate that Coulomb friction forces amount to about 50% of the total force required to achieve full speed.

Strain gauge force sensor system for height and drive

A strain gauge half bridge will be used with the two gauges mounted on opposite sides of the stressed member. This will provide temperature compensation and increased sensitivity.

The type of strain gauge used should have a gauge factor of 2. This will give an output defined by:

$$\text{gauge factor} = 2 = (dR/R)/(dL/L)$$

where dR/R is gauge resistance change and dL/L is strain

For a gauge having 120 ohms resistance and with a 1000 microstrain input, the half bridge output will be 1 mV per Volt of bridge excitation.

The system is equally applicable to an electronic drag system for the control of motorised pan/tilt head movement of the camera on its mounting.

We claim:

1. A camera mounting for supporting and moving a camera supported on the mounting, the mounting comprising:

a motor system for driving the mounting in directions along and about a plurality of axes;

a pedestal including a base supported on motorised steerable wheel units;

a motorised column, vertically adjustable along a column axis, wherein the platform is coupled to an upper end of the column;

a control unit mounted on the column for rotation about the column axis to energise the motor system;

an arcuate control member coupled to the control unit for applying controlling forces manually to the control unit so that the control unit produces movement of the mounting corresponding to forces applied to the control member;

wherein the control unit includes first force responsive means responsive to forces applied to the control member parallel to the column axis to control the motor system to extend and retract the column along the column axis, and second force responsive means responsive to horizontal forces applied to the arcuate control member to control the motorised wheel units to move the pedestal horizontally and wherein the control unit includes movement responsive means responsive to rotation of the control unit about the column axis for controlling the steering of the motorised wheel units.

2. A camera mounting as claimed in claim 1 wherein the second force responsive means is arranged to accelerate and decelerate the pedestal in relation to an inertia of the pedestal and a horizontal force applied to the control member to maintain the pedestal at a constant speed with a force determined by a rolling resistance of the pedestal.

3. A camera mounting as claimed in claim 1, wherein second force responsive means of the control unit includes a bendable beam having a portion which is mounted to bend uniformly throughout the length of the portion, the control member being coupled to the beam to apply a bending movement thereto in response to a horizontal force on the control member wherein means are provided for detecting strain in the portion of the beam for controlling the motorised wheel units of the pedestal in response to the applied force.

4. A camera mounting as claimed in claim 1, wherein the first force responsive means is arranged to raise and lower the column at a speed determined by a vertical force applied to the control member as if the column were a fully counter-balanced low friction column.

5. A camera mounting as claimed in claim 4, wherein the control unit includes a bendable plate coupled to the control member so that vertical force applied to the control member bends the bendable plate and, wherein means are provided for detecting the bending of the plate to control extension and retraction of the motorised column.

* * * * *